US006950982B1

(12) United States Patent
Dourish

(10) Patent No.: US 6,950,982 B1
(45) Date of Patent: Sep. 27, 2005

(54) ACTIVE ANNOTATION MECHANISM FOR DOCUMENT MANAGEMENT SYSTEMS

(75) Inventor: James P. Dourish, San Francisco, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/443,702

(22) Filed: Nov. 19, 1999

(51) Int. Cl.$^7$ .............................................. G06F 15/00
(52) U.S. Cl. ........................ 715/512; 715/524; 713/1; 713/100
(58) Field of Search ............................ 715/512, 501.1, 715/500.1, 515, 526, 511, 524; 709/217, 709/220–222; 713/1, 100

(56) References Cited

U.S. PATENT DOCUMENTS

| | | | |
|---|---|---|---|
| 4,925,176 A | | 5/1990 | Acquaviva |
| 5,239,466 A | * | 8/1993 | Morgan et al. ............. 715/512 |
| 5,524,193 A | * | 6/1996 | Covington et al. ......... 715/512 |
| 5,526,443 A | | 6/1996 | Nakayama |
| 5,581,682 A | * | 12/1996 | Anderson et al. ........... 715/530 |
| 5,717,439 A | | 2/1998 | Levine et al. |
| 5,848,426 A | * | 12/1998 | Wang et al. ................ 715/505 |
| 5,872,974 A | * | 2/1999 | Mezick ....................... 717/109 |
| 5,920,685 A | | 7/1999 | Romano et al. |
| 5,956,698 A | | 9/1999 | Lacheze et al. |
| 5,966,718 A | | 10/1999 | Shibata |
| 6,122,649 A | * | 9/2000 | Kanerva et al. ............ 715/516 |
| 6,167,439 A | * | 12/2000 | Levine et al. ............... 709/217 |
| 6,240,429 B1 | | 5/2001 | Thornton et al. |
| 6,253,217 B1 | | 6/2001 | Dourish et al. |
| 6,308,179 B1 | | 10/2001 | Petersen et al. |
| 6,397,213 B1 | * | 5/2002 | Cullen et al. ................. 707/5 |
| 6,438,564 B1 | * | 8/2002 | Morton et al. .............. 715/500 |
| 6,562,076 B2 | | 5/2003 | Edwards et al. |
| 6,865,713 B1 | * | 3/2005 | Bates et al. ................. 715/512 |

OTHER PUBLICATIONS

Bill Schilit et al., entitled: "XLibris: An Active Reading Machine" Published by FX Palo Alto Laboratory, Inc, 1999, pp. 1-3.*
Steve B. Cousin et al., entitled: "A Systems View of Annotations" Pulished by Xerox Palo Alto Research Center, date unclear.*
Kenton O' Hara et al., entitled: "A Comparison of Reading Paper and On-Line Documents" Pubished by Rank Xerox Research Centre, 1997.*
"Reviewing documents with Microsoft Word 97", Information Technology Service, University of Durham, Oct. 1998.
"Workgroup Features in Microsoft Word", Microsoft Office, Chapter 33, Part 5, pp. 1-10; Microsoft Office 97/98 Resources Kit, http://www.microsoft.com/office/ork/033/033.htm, 1998.

(Continued)

Primary Examiner—Joseph Feild
Assistant Examiner—Mikhanh Nguyen
(74) Attorney, Agent, or Firm—Fay, Sharpe, Fagan, Minnich & McKee, LLP

(57) ABSTRACT

An active annotation mechanism detects annotations on a document which may be in the form of in-line annotations and out-of-band annotations, which may be inputted through a variety of input devices. The active annotation mechanism detects the annotations added to a document and determines whether the annotation of the document requires further action or whether the annotation is simply commentaries on the text, a note of other related items, etc. When it is determined that annotations require further action, the annotation is detected. The active annotation will carry an indication of an activity to be carried out, or a parameter that configures the activity, or both. The active annotation which has been detected, is then carried out by the document management system.

10 Claims, 7 Drawing Sheets

OTHER PUBLICATIONS

"Adding Metadata to improve retrieval: Yet Another Web Annotation System", Laurent Denoue, Feb. 99, pp. 1-5; Syscom Team, University of Savoie, France, *Laurent.Denoue@univ-savoie.fr*.

"Annotate!" Project Description, Roland Alton-Scheidl, et al.; Annotate!, pp. 1-4, http://old.pvl.at/annotation/project.html, 1998.

"Using Microsoft Word in the Composition Classroom", Using Microsoft Work in the Computer Classroom, http://www.siu.edu/~compcomp/Tech/word.html , pp. 1-4, undated.

"Non-simultaneous web-based groupware", Web4Groups overview, http://cmc.dsv.su.se/w4g/web4groups-summary.html, pp. 1-3, Nov. 1999.

* cited by examiner

ACTIVE ANNOTATION MECHANISM FOR DOCUMENT MANAGEMENT SYSTEMS

FIELD OF THE INVENTION

The present invention is directed to document management systems, and more particularly to a mechanism which allows an activity to be undertaken based on an added annotation to the document.

BACKGROUND OF THE INVENTION

As users read documents, they often annotate the document with a variety of related items of information, by writing notes in margins or on the front of the document, by underlining, circling and otherwise "marking-up" the text. Annotations take the form of commentaries on the text, notes of other related items, and consequences for future activities. Examples of annotations with consequences for future actions, include notes to send copies of the documents or extracts of the document to others, indications of how the document should be filed, if the document should be deleted, or should the document be passed to a next level in a work flow process. In general then the annotation can provide instructions of what should next happen to the document. Many digital document systems provide an annotation capability to allow users to add notes of interest to documents. Annotations are provided in a variety of ways, including but not limited to in-line annotations, or out-of-band annotations such as linked comments or marginal notes, or by entry of voice controlled inserts.

In existing annotation systems, the annotations are done only for a user's benefit or for collaborative efforts such as identifying changes made by different users. Also, a system interpretations of the annotations for further actions are not provided. Rather, the interpretation of the annotations are done solely by human intervention and if the annotation requires further action, such action is taken through human action.

For example, if an electronic note indicates the document should be "sent to Fred", it would be necessary for the user of the open document system to manually e-mail, fax, transfer to a different file system, or otherwise make the document available to Fred.

The present invention intends to overcome the drawbacks related to requiring human intervention for the carrying out of annotations directed to consequences for future actions which will be taken with regard to the document.

SUMMARY OF THE INVENTION

An active annotation mechanism is provided for use in association with a document of a document management system, where the document has had an annotation added. The document is electronically scanned to detect an annotation. The annotation is then decoded to determine whether an action is to be undertaken with reference to the document, based on the annotation. When it has been determined that the annotation requires an action, the action is carried out by the document management system.

DETAILED DESCRIPTION OF THE PREFERRED EMBODIMENTS

The annotation of a document being reviewed is a common activity. As users review documents, they often annotate the document with a variety of related items of information, by writing notes in margins or on the front of the document, by underlining, by circling and otherwise "marking-up" the text. The following discussion addresses annotations which require some further activity related to the document. Such further activity may include, but is not be limited to, sending the copies of a document or abstracts of the document to other people, indications of how the document should be filed, or indications of what should happen to the document next in a work flow process. The present invention provides a system which is both aware of the nature of the annotation content, and of the other applications whose behavior should be coordinated. Such a system therefore allows automation of the activities described in the annotations.

Figure 1:
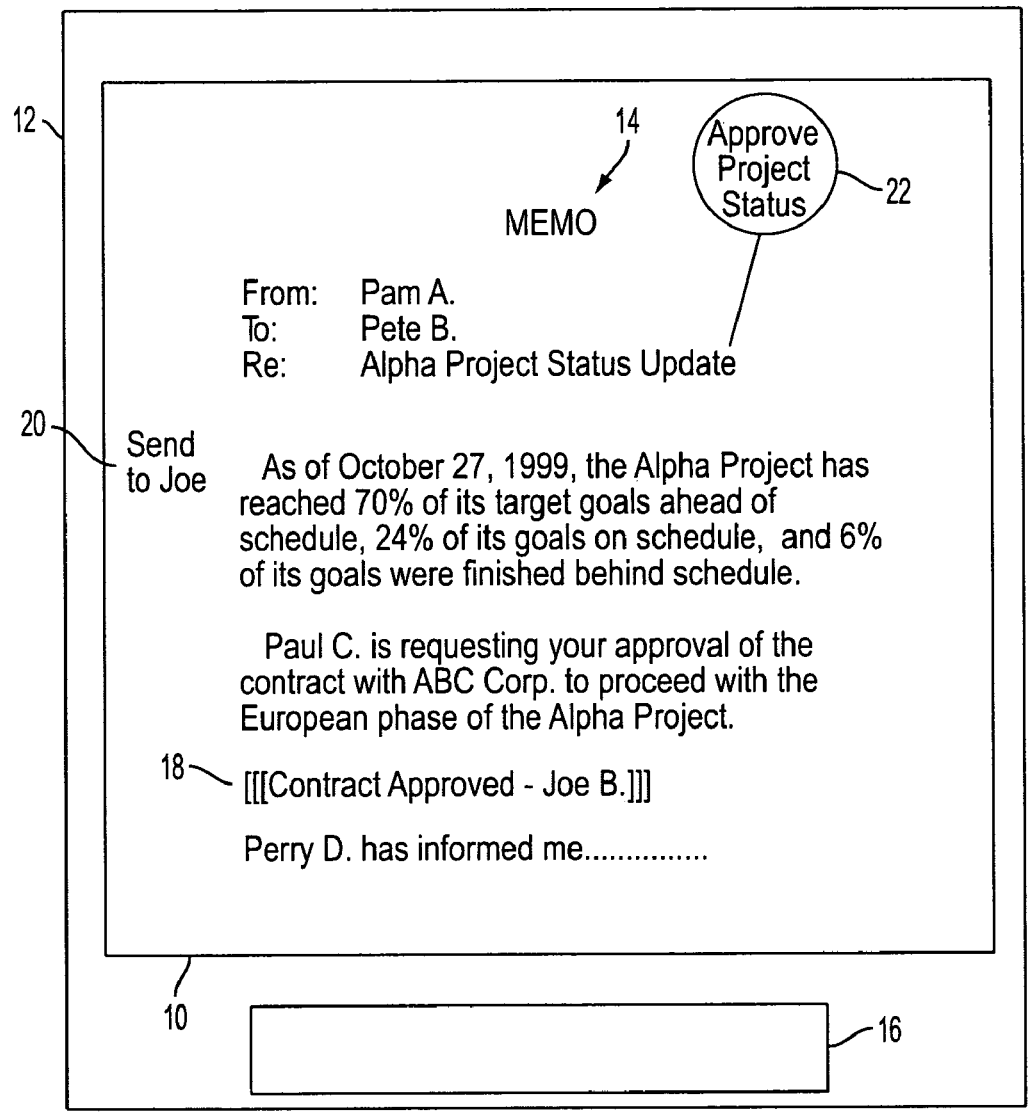
FIG. 1 illustrates a document with various forms of annotations.

FIG. 1 depicts a display 10, of a portable document reader, portable digital assistant (PDA), PC computer, Laptop computer, or other electronic device 12 which allows a user to view a document 14, and which includes some manner of input device 16 such as a mouse, keyboard, stylus, voice activated interface, electronic pen, etc.

Annotations on document 14 may be in the form of in-line commentaries 18, such in-line comments may be embedded within brackets or are provided with some identifying characteristic such as being included within triple brackets in a highlighted color, or by some other designation which would indicate to a user that this is an annotation. Out-of-band notations such as linked comments or marginal notes 20 may also be provided in a similar manner. If the input mechanism is a stylus or electronic pen, the marginal notes may be in a handwritten form. Annotations may be graphical/symbolic. For example, an arrow or other symbol may be used to indicate an action such as, "send document to". Annotations could also be provided in a balloon format 22 where the comment only arises when a cursor on a computer screen moves over the commented area. These are just simply some examples of how annotations may be added to electronic documents.

Figure 2:
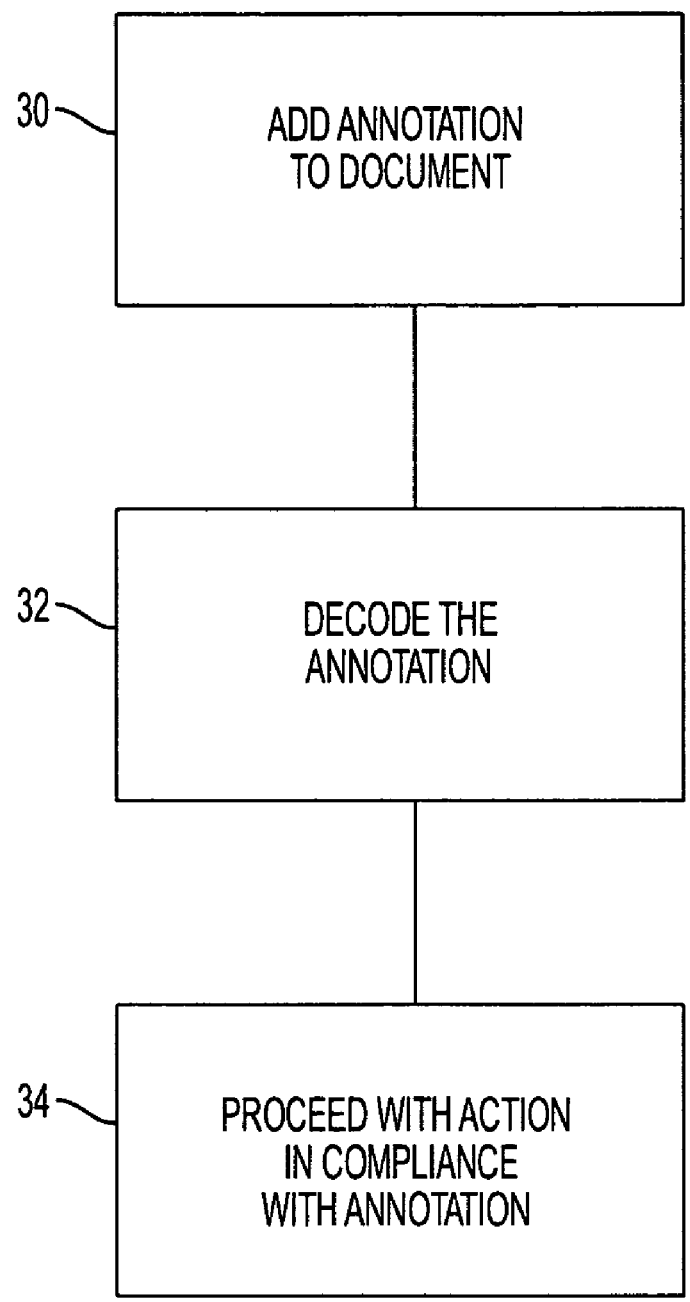
FIG. 2 is a flow chart depicting a high-level view of the actions according to a system of the present invention.

Turning to FIG. 2, illustrated is a high-level flow chart showing steps for operation of the present invention. Initially, an electronic document will need to have a procedure whereby an annotation is attached to a document 30. It is recognized that many document management systems, from word processors to web browsers, provide some mechanism for annotations. The present invention may work in conjunction with these types of systems. Alternatively, if the document management system does not provide for a mechanism for annotation attachment, since the present invention is designed to be associated with the document content, rather than a specific application for accessing the document, it operates independent of the application used. Therefore, if the document management system does not provide an annotation mechanism, in-line and out-of-band annotations may be added which will be recognized by the system.

Once an annotation has been added to a document, it is necessary to understand the annotation 32. Therefore, a mechanism is provided to decode the annotation 32, to determine whether the annotation requires further action or whether the annotation is simply a commentary on the text, or a note of other related items. If it is determined that the annotation which has been detected does require some further action, the present system provides a mechanism for performing the further requested activity 34. The procedures of steps 30–34 are discussed in greater detail below.

Figure 3:
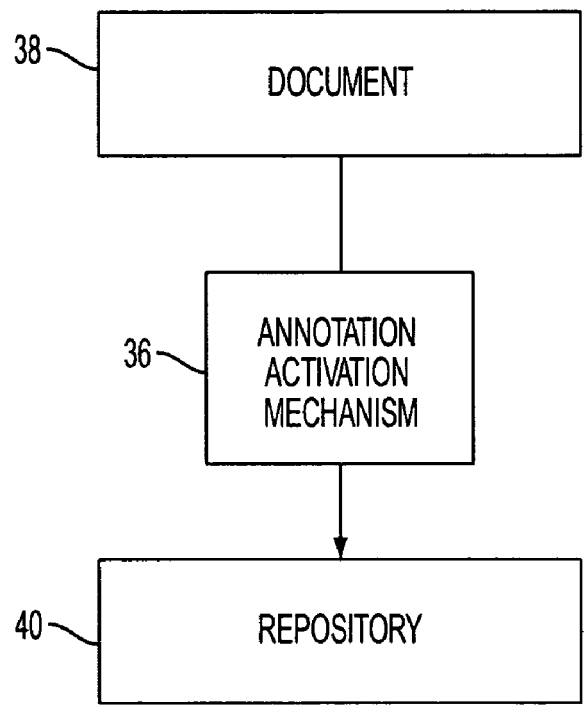
FIG. 3 is a block diagram of components arranged to operate in accordance with a first embodiment of the present invention.
Figure 4:
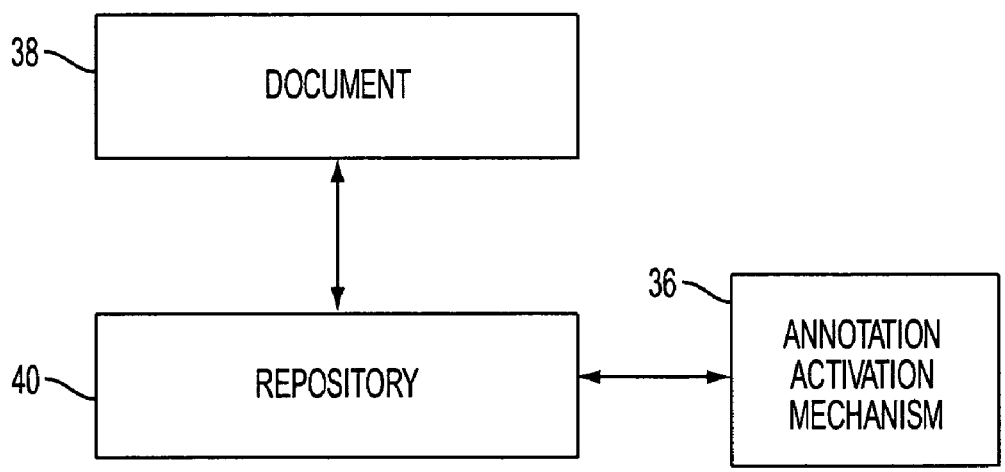
FIG. 4 illustrates a block diagram of components arranged to operate in a second embodiment of the present invention.

FIGS. 3 and 4 depict alternative arrangements of a document system implementing an annotation activation mechanism 36, used for activating the annotations shown in FIG. 1. In FIG. 3, annotation mechanism 36 is interposed between document 38 and repository 40 designed to hold document 38. An alternative embodiment of this configuration is shown in FIG. 4, wherein annotation activation mechanism 36 is designed to be activated once document 38 has been stored in repository 40. In either embodiment, by associating annotation activation mechanism 36 with document 38 and repository 40, annotation activation mechanism 36 is able to determine when documents are stored with new annotations.

When in FIG. 3, the document is instructed to be stored in repository 40, annotation activation mechanism 36 is invoked. Alternatively in FIG. 4, after document 38 has been stored in repository 40, annotation activation mechanism 36 is invoked. In both situations, when invoked, annotation activation mechanism 36 scans document 38 for new annotations.

Figure 5:
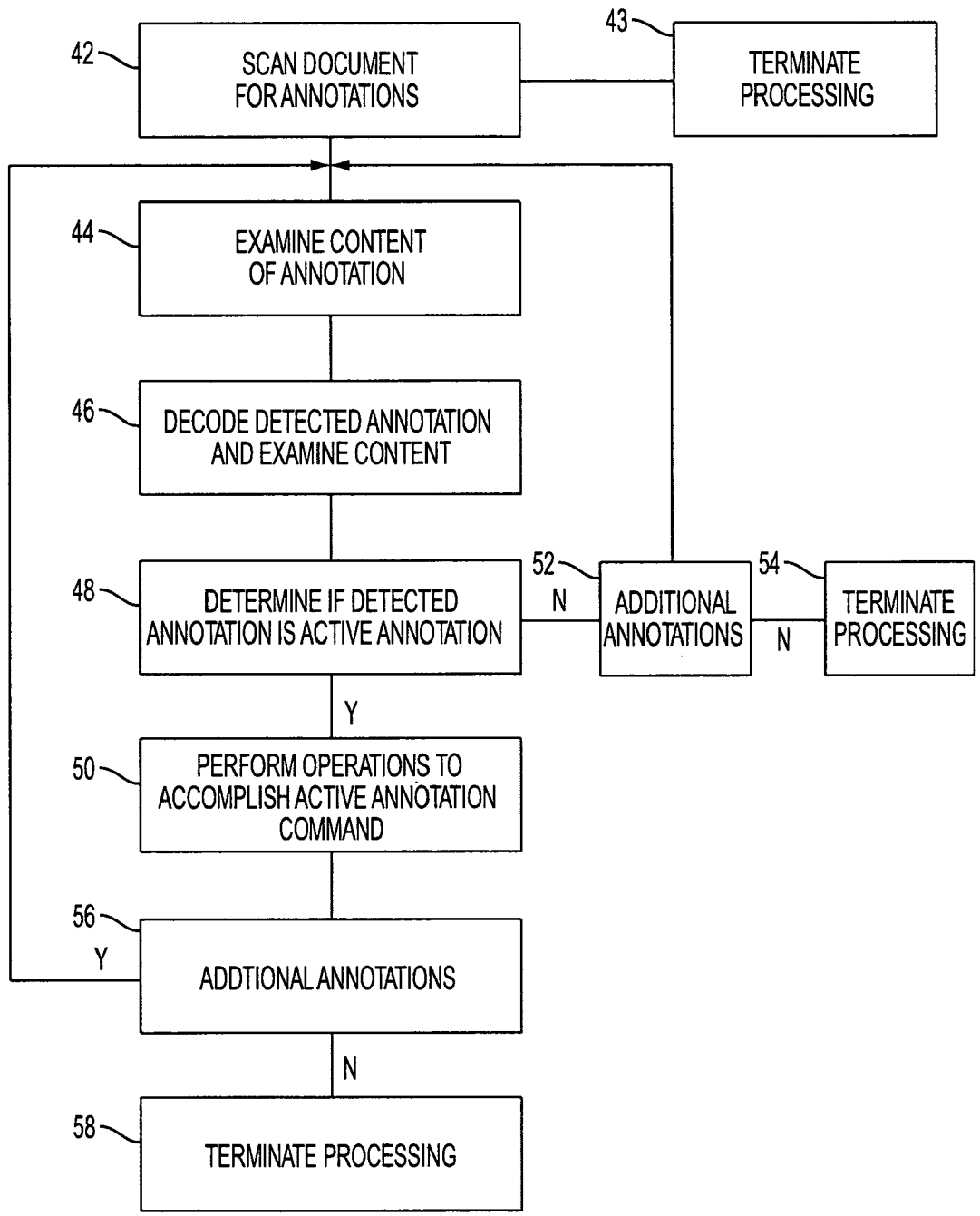
FIG. 5 depicts a flow chart showing the operational steps which are implemented in the embodiments shown in FIGS. 3 and 4.

FIG. 5 is a flowchart setting forth one embodiment of operation of annotation activation mechanism 36 once it is invoked. Initially, it scans the document to determine whether annotations have been added to the document 42. If annotations are not detected, the process is terminated 43. If annotations are detected, they are stored and the process moves on to step 44. At this step, the annotation activation mechanism examines the content of one of the annotations 44. As part of this examination, the annotation activation mechanism decides the annotation and examines its content. Next, in step 48 the detected annotation is examined for commands that have some act of consequence 48. Active annotations will carry the indication of an activity to be carried out (e.g. "e-mail") or a parameter that configures the activity (e.g. "to Bill"), or both. If it is determined the decoded annotation has commands for some act of consequence, the document management system operates to carry out the command 50. If it is determined in step 48 that there are no active commands within the decoded annotation, an inquiry is made as to whether additional annotations exist on the document 52. When additional annotations exist, the system returns to examination step 44 for decoding these annotations. If no additional annotations exist, the processing terminates 54.

Following step 50, and similarly to the foregoing discussion, the system investigates whether additional annotations exist 56, and returns to examination step 46 if the step 56 is in the affirmative. Alternatively, if no additional annotations are found, the processing terminates for the document 58.

Annotations do not need to be stored separately from the content of the document. An annotation might, itself, simply be part of the document content. Therefore, this active mechanism operates over the content of any document, such as plain text, files, program source code, presentations or other types of data or information.

To further describe the concepts of the present invention, the following example is provided. During a plane flight, a user "Bob" may be catching up on his reading using a portable document reader, which has been loaded with documents awaiting his attention. He reads a background report regarding a competing product, and notes in the margin of the document, "send a copy to David." Next Bob reads a budget request for a new piece of office equipment and notes "status: approved" across the top. Finally, he reads a competitive analysis of the product development process at other companies, and notes, "file with process planning" in the margins. He makes the annotations using his standard mark-up tool, i.e. stylus, pen, keyboard, or other known device.

When Bob returns to his office, he may place his portable document reader in a docking station where the files are checked into his document management system. The active annotation activation mechanism 36 scans the documents and notices that they have been annotated. It reads the annotations, and performs the actions required. Particularly, a copy of the background article will be sent to David as an e-mail attachment; a workflow system is updated to reflect the fact that the equipment request has been approved, and generates a purchase order; and the list of documents related to the new process planning activity is updated with the competitive analysis, causing other interested parties to receive an e-mail notification.

Thus, the consequences of the annotations which required further activity did not require human intervention once the information had been uploaded into the document management system. Rather, annotation activation mechanism 36 which is aware of both the nature of the annotation content, and other applications in the document management system whose behavior needs to be coordinated, is capable of providing this active link.

The annotation activation mechanism 36 has been described as being activated or made aware of the annotations once the document has been stored or is in the process of being stored into a document repository. However, it is to be appreciated that the activation, or waking up of annotation activation mechanism 36 may be accomplished in other ways. In particular, a timer may be provided which awakens annotation activation mechanism 36 at predetermined intervals to search for any new document entries in the repository 40. This may be accomplished during off-peak hours, when less operating overhead requirements exist. Thus, annotation activation mechanism 36 may gain access to a document when some movement of that document occurs, such as being re-stored in a repository, or it may wake up at intervals and be configured to investigate if any document changes have occurred from the last time it checked.

While it is to be appreciated that the present invention is not dependent on any particular document management system, it may be implemented in a document system such as described in U.S. application Ser. No. 09/144,231 (U.S. Pat. No. 6,253,217, issued Jun. 26, 2002), entitled "Active Properties for Dynamic System Configuration", filed Aug. 31, 1998; U.S. Ser. No. 09/143,777 (U.S. Pat. No. 6,562,076, issued May 13, 2004), entitled "Extending Application Behavior Through Document Properties", filed Aug. 31, 1998; U.S. Ser. No. 09/143,773 (U.S. Pat. No. 6,240,429, issued May 29, 2002), entitled "Service Interaction Using Properties Attached To Documents", filed Aug. 31, 1998; and U.S. Ser. No. 09/143,551 (U.S. Pat. No. 6,308,179, issued Oct. 23, 2002), entitled "Property-Based User Level Document Management", filed Aug. 31, 1998, all commonly assigned and hereby incorporated by reference.

In a system as Described in the foregoing applications, a user is provided with access to properties of a document management system. The user attaches selected properties to a document. The document with the attached properties is then stored at a location separate from the content of the document. Thereafter, a user may retrieve the document using at least one of the attached properties, such retrieving including obtaining the content of the document. The storage of the content separate from the properties is part of the separate management of the properties and the content.

Property Attachment

In the present embodiment, a property which may be attached to a document in order to accomplish the concepts of the present invention may be a "detect document update", or similarly functioning property. The following describes how a property, such as "detect document update" is attached.

Figure 6:
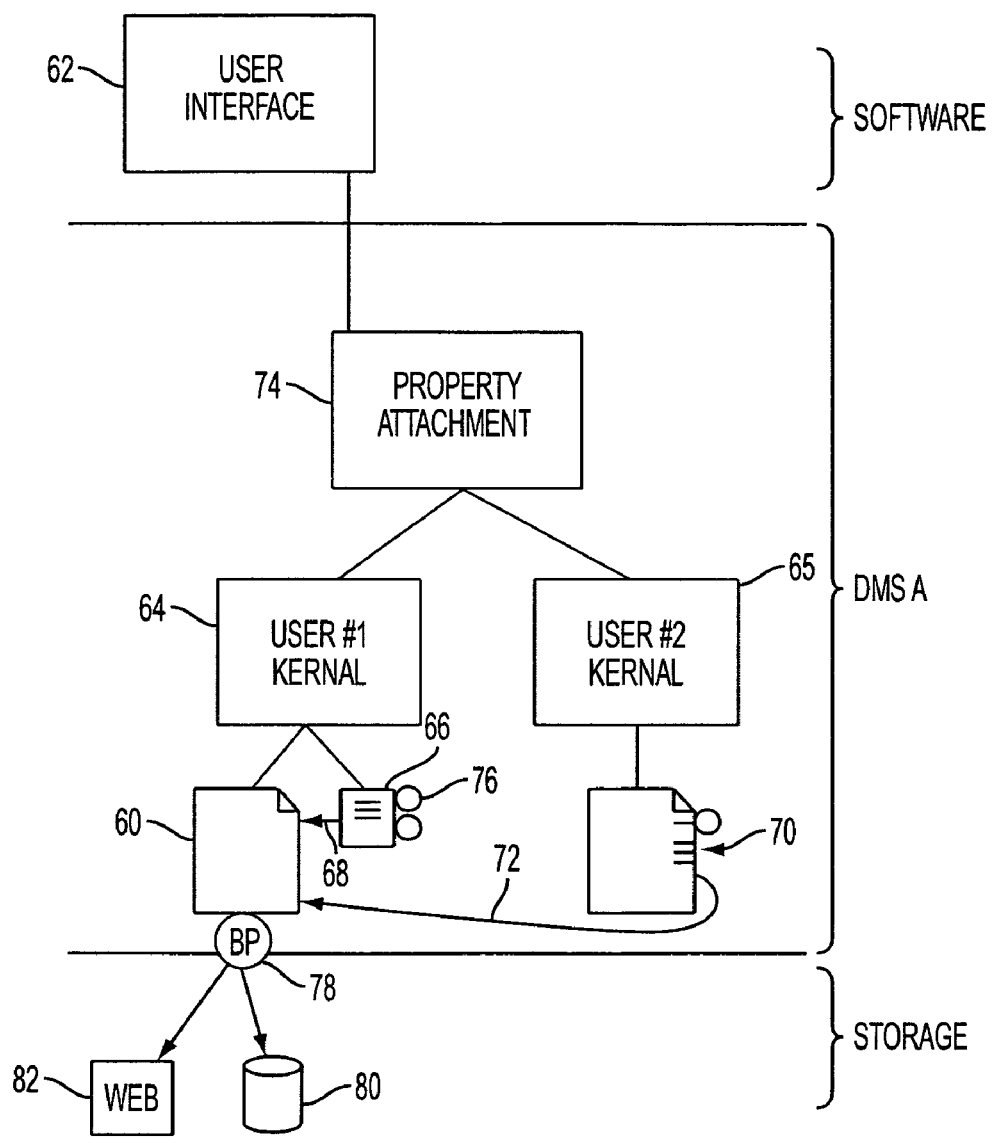
FIG. 6 is a configuration of a document management system in which the concepts of the present invention may be implemented.

FIG. 6 shows a document management system A which provides for attaching properties to a document 60. A user interface 62 allows a user to select a desired document and select one or more properties to be attached to the selected document. The document management system A locates and retrieves the selected document in accordance with its management system protocol.

In FIG. 6, the selected document 60 is found to be owned by user #1. However, the user wishing to attach a property to document 60 can be any user in the system. The document management system A maintains properties on a per user per document basis using individual kernels. Kernel 64 manages documents and properties for user #1 and kernel 65 manages documents and properties for user #2. Thus, a user #1 can generate a set of properties 66 for document 60 (associated via link 68) which are independent from the properties 70 of user #2 (associated via link 72) for document 60.

A property attachment mechanism 74 is provided by the document management system A which generates, configures and attaches properties 66 to the document 60 represented by association links 68. In one embodiment, the document 60 is identified by a unique ID and the property references the document using the same unique ID. The properties 66 include static properties (represented by horizontal lines) and active properties (represented by circles). Static properties are simple name-value pairs on documents which are relevant to a user, for example, "author=Joe" or "topic=interesting." An active property 76 has a name-value and includes executable program code and/or instructions for automatically performing an operation or service without a user's involvement. Documents can be collected, searched and retrieved based on static properties and/or active properties.

The active property 76 is configured to be activated by a triggering event which is defined by the user. Attaching the active property 76 to the document 60 forms an association between the property and the document. The association is external to the data that represents the content of the document 60. Thus, the association is independent of content type, the application format used to generate the document, and other characteristics of the document 60. The content of document 60 is controlled by a bit provider 78 which identifies the location of the data (e.g. local disk 80, world wide web 82, a camera, or any data supplying source), indicates how the data from the sources are combined to form the content of the document 60, includes a translation interface to communicate to the data source, and other selected parameters which define the content.

Dynamic System Configuration

Figure 7:
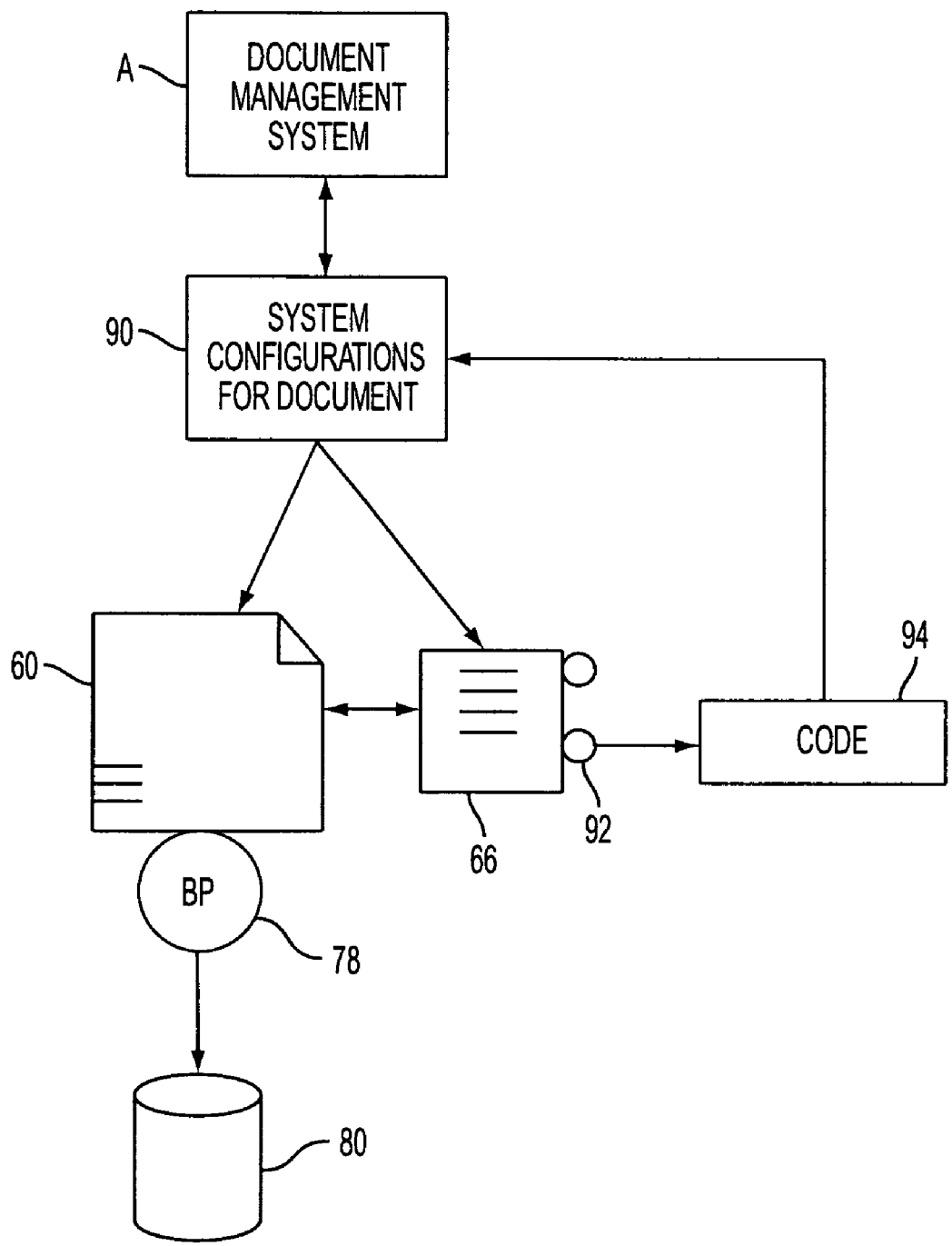
FIG. 7 illustrates a document having attached properties which change system configurations.

With reference to FIG. 7, active properties attached to document 60 are configured to dynamically change system configurations and/or parameters 90 which control the manner that the document management system A manages document 60. Active property 92 is attached to document 60 and includes executable code 94. The code 94 is a pre-coded routine or program written to set specific configuration settings or to change system configurations and requirements in response to current or desired states of the system. The pre-coded routines may use values of static properties from the document as parameters to the configuration management step. The code 94 can be provided by a commercial supplier or can be written by a user having system programming skills.

Active properties provide a unifying abstraction for expressing many different configuration desires and interfacing to different mechanisms for establishing the desired configuration identified in the property. By attaching active properties to change a document's configuration, a user can express high-level desires and requirements, such as "detect document update" instead of (or in addition to) having a working knowledge of specific configuration settings.

With continued reference to FIG. 7, the system simplifies the configuration process. A user simply attaches a property 92 to the document 60 which identifies a desired configuration for the document 60 such as "detect document update", "located on a file server A", "readable by project group B", etc.

The implementation of each of these properties is pre-coded in a program 94 which executes the tasks involved in placing the file on the desired file server, setting the appropriate access controls, etc. The details of how the program 94 performs the tasks will vary depending on the type of the server, but the user does not need to be familiar with these details.

With more specific attention to the present invention, a user selects document 60 having a specific system configuration or requirement for the document. The user attaches an active property 92 to the document reference 66 of document 60. In a preferred embodiment, the user selects a desired setting of "detect document update" as the value of the property 92. The property 92 becomes an active property when it is configured to control a behavior through the use of executable code 94. In this case, code 94 is a pre-coded routine or program which is designed to detect added information to the document.

The document management system A controls and manages document 60 in accordance with a set of system configurations 90 defined for the document 60. Based on the active property "detect document update" 92, the code 94 dynamically changes the system configurations 90 for document 60.

For example, code 94 includes intelligence sufficient to detect whether the added information are annotations. If the added information is determined to be an annotation, the code 94 then detects the detected annotation. For example, for the annotation, "send to Joe," the code is sufficiently sophisticated to decide that the best way to send document 60 to Joe is to place a copy on a shared file server and give Joe read access to it. Or, the system can decide, based on profile information maintained about Joe, that Joe would prefer to receive the document 60 via e-mail. Overall, there are different paths to accomplish the "send to Joe" annotation, and it is the code and system that decide on the best course of action based on a variety of inputs. Due to a user profile or other parameter for example, the "send to Joe" annotation may cause different actions to take place than a "send to Mary" annotation even though they look quite similar.

Thus, the "detect document update" property 92, is a reflection of what the user desires, not how to provide it. The user does not care what is required to accomplish the instructions of the annotation. The algorithm for performing the detection, parsing and action steps could be quite complex. The code may need to take into account the lists of potential parties to receive the document, how the document is to be transferred, timeliness of the activities, storage capabilities, among other potential requirements. While designing a good algorithm to change a configuration is not easy, designing it once and attaching it to documents as an active property is a much better approach than requiring each user to design the algorithm every time they create a document or wish to change a configuration.

The foregoing description of the annotation "send to Joe" is simply one type of annotation that may be detected, detected and then acted upon. Other annotations such as, save file, delete document from file, an approval signature (i.e. where a second stage of a work flow process cannot be implemented until an approval signature is received for the first stage), and others may be provided for within the code of the active property which in this example has been defined herein as a "detect document update" active property, but which may be identified by some other name.

It is to be appreciated that varying forms of annotations may be interpreted by the system, since it is not the annotation which is active, but rather the property which provides action to the property. Thus, the code for the active portion of the property may be designed with a great deal of flexibility.

It is also to be appreciated that while the foregoing examples were described in an environment where properties exist separate from the content of the document, the concepts of the present invention may be used and implemented in applications whose content is normally static. This is true since the annotations which require consequences for future activity can be made to be carried out without any further action on the part of the user. This is possible since the now active annotations can coordinate the behavior of multiple applications, even though those applications have no direct link to each other.

As previously mentioned, the present invention may operate in a document system that does not provide an explicit annotation mechanism. By scanning the document content, annotation activation mechanism 36 can extract relevant directives from the document content itself. For example, annotation activation mechanism 36 may be designed to interpret in-line data which is triple-bracketed (or with some other identifier) to represent an annotation. Activating such in-line annotations extends the range of this invention beyond systems that provide explicit annotation mechanisms.

Further, since the activity is associated with document content, rather than a specific application for accessing the document, the present invention may operate independent of the application used. In-line textual annotations will take effect whether the document is edited with eMacs, Notepad, Word, Simple Text, or any text-capable editor.

Figure 8:
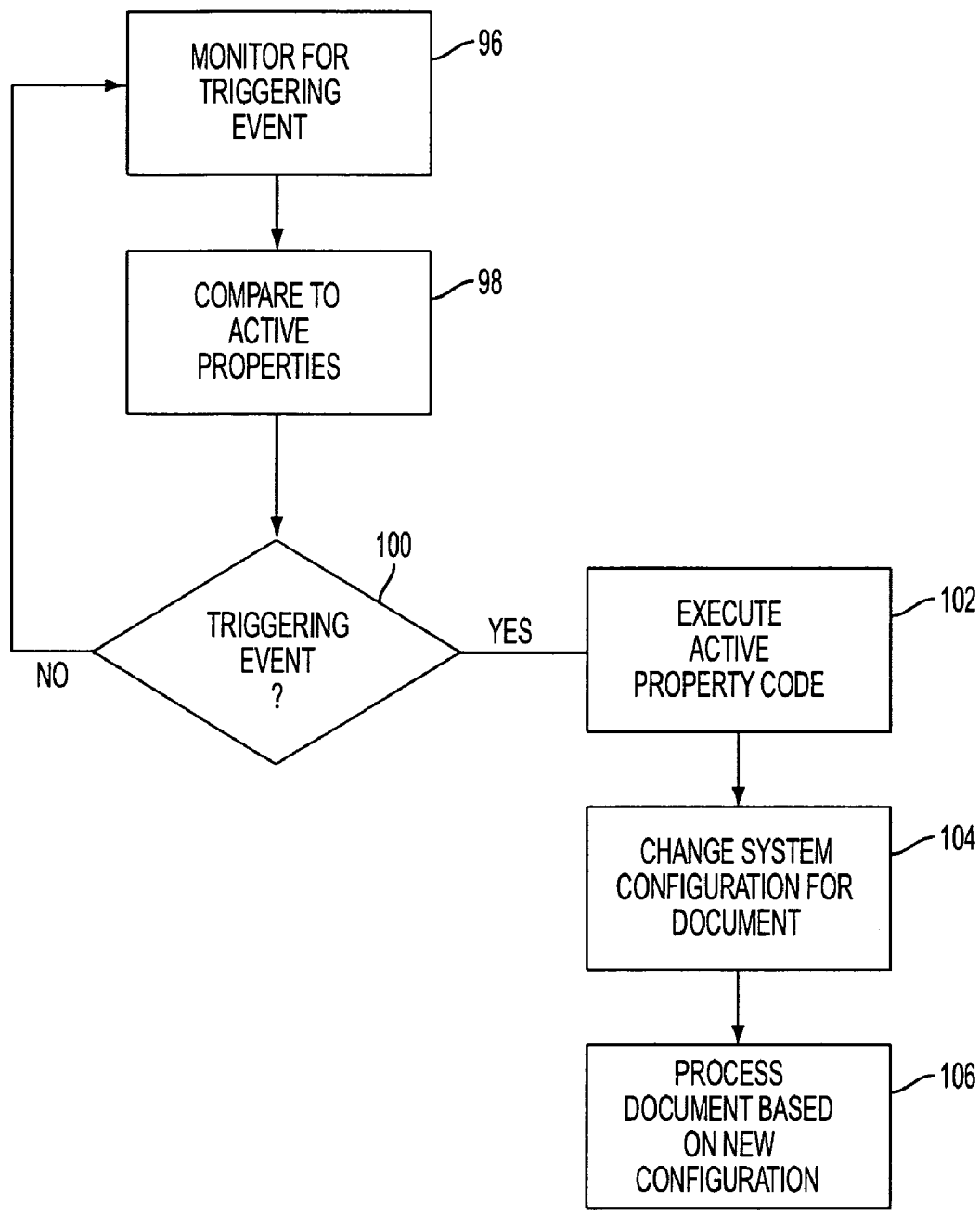
FIG. 8 illustrates an exemplary block diagram for triggering an active property in accordance with the present invention.

With reference to FIG. 8, a method and system for activating active properties and executing code 94 is described. As previously explained, active properties are configured to be activated by the occurrence of a triggering event which is assigned to the active property by the user (e.g. "detect document updates"). In order to detect a triggering event, the document management system A monitors 96 the system for triggering events. A triggering event can be defined by the user to be any operation or event such as one that is initiated by an application, by the system, by a system parameter, by another document, by another active property, by a timer or any mechanism desired by a user. When an event is detected, it is compared 98 to the active properties of the document and a determination 100 is made whether the event is a triggering event assigned to one or more of the properties in the document reference. If the event is a triggering event, the corresponding active property is activated to execute 102 its active property code. The code then dynamically changes 104 the selected system configuration for the document to include the desired configuration identified by the active property. Upon completion of the code, the document is controlled 106 by the document management system A in accordance with the new system configuration for the document.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A method of annotating a document of a document management system, the method comprising:
   generating executable code to detect an annotation which requires an action to be undertaken;
   assigning the executable code configured to an active property for dynamically changing a system configuration of the document to include a desire configuration which achieves a desired operation; and
   attaching the active property to the document, the property identifying the desired operation to be undertaken in connection with the document as required by the annotation;
   electronically scanning the document;
   detecting the annotation added to the scanned document;
   decoding the detected annotation;
   examining content of the decoded annotation;
   determining an action to be undertaken with reference to the document, based on the content of the annotation; and
   performing the action required by the content of the annotation, wherein the document management system is configured to dynamically charge the system configuration of the document.

2. The method according to claim 1 wherein the annotation is detected by an active annotation mechanism configured to be aware of a nature of the annotation content and applications whose behavior is coordinated to perform the action required by the annotation, and wherein operation of the active annotation mechanism permits performance of the action required by the content of the annotation without user intervention.

3. The method according to claim 2 wherein the active annotation mechanism is invoked when the document is stored.

4. The method according to claim 2 wherein the active annotation mechanism is invoked at predetermined time intervals.

5. The method according to claim 1 wherein the annotation carries at least one of an activity to be carried out and a parameter that configures that activity.

6. The method according to claim 1 wherein the annotation is stored with the document.

7. The method according to claim 1 wherein the annotation is stored separate from the document.

8. The method according to claim 1 wherein the active annotation mechanism operates over at least plain text, files, program source code and presentations.

9. The method according to claim 1 wherein the annotation is placed on the document at least as one of an in-line annotation and an out-of-band annotation.

10. The method according to claim 1, further including, assigning a triggering event to the active property such that the property invokes the executable code in response to the triggering event; and upon an occurrence of the triggering event, invoking the executable code of the actual property and dynamically changing the system configuration of the document to include the desired configuration, as required by the annotation.

\* \* \* \* \*